3 Sheets--Sheet 3.
H. THIESSEN.
Velocipedes.
No. 155,270. Patented Sept. 22, 1874.
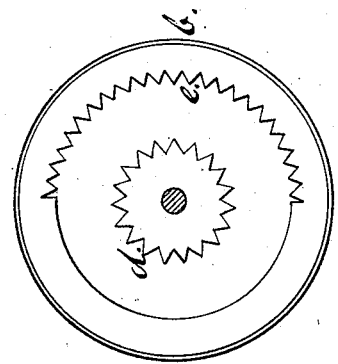
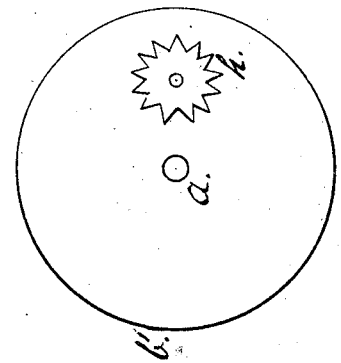
Fig. 3
Witness
Horace Harris
John G. Tunbridge
Inventor
Henry Thiessen.

UNITED STATES PATENT OFFICE.

HENRY THIESSEN, OF NEWARK, NEW JERSEY.

IMPROVEMENT IN VELOCIPEDES.

Specification forming part of Letters Patent No. 155,270, dated September 22, 1874; application filed June 18, 1874.

*To all whom it may concern:*

Be it known that I, HENRY THIESSEN, of Newark, in the county of Essex and State of New Jersey, have invented a certain improvement in mechanical carriages to be operated by man-power, of which the following is a specification:

My invention consists in the combination of lever, swing-weight or momentum-regulator, slotted cylinder, and pitmen, united with the cranks of an axle as a driving-power; also in the extra brake attachment and steering apparatus.

Figure 1:
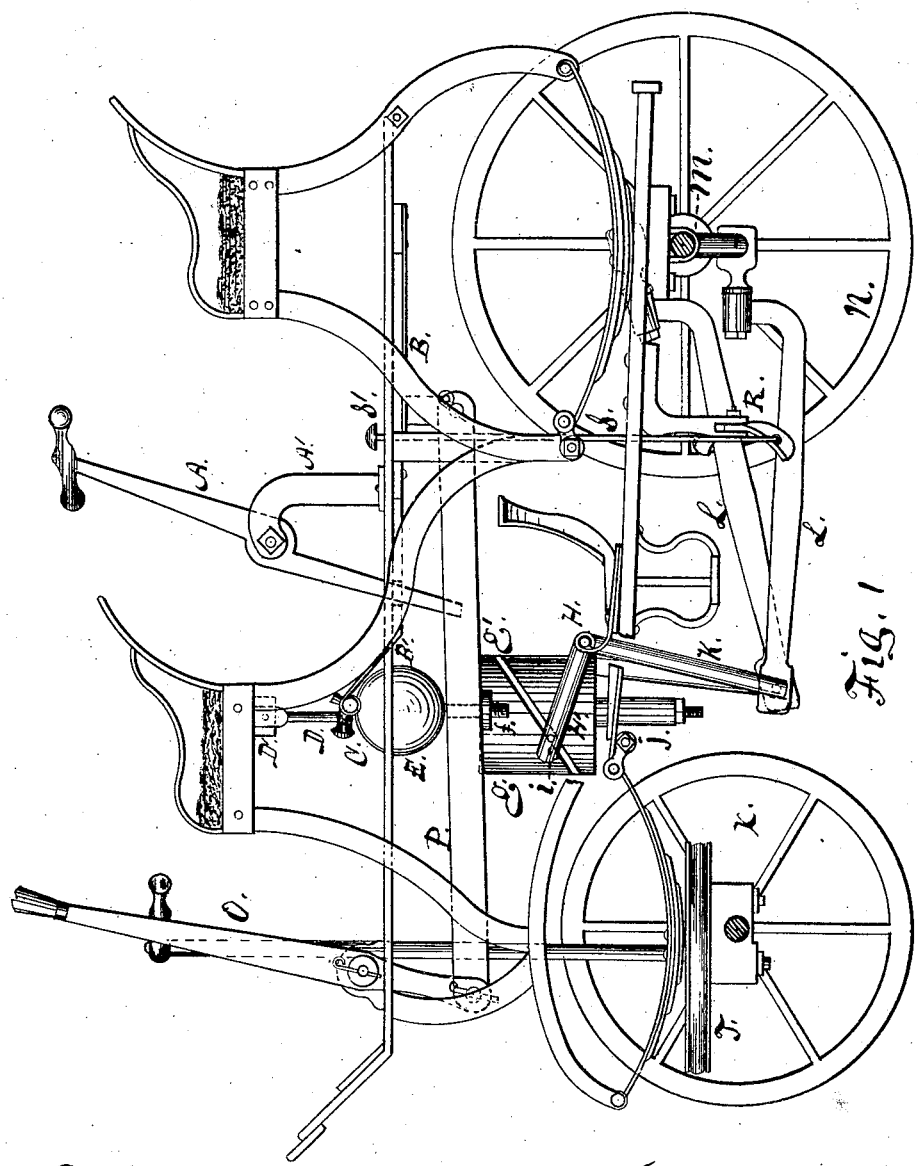
Figure 2:
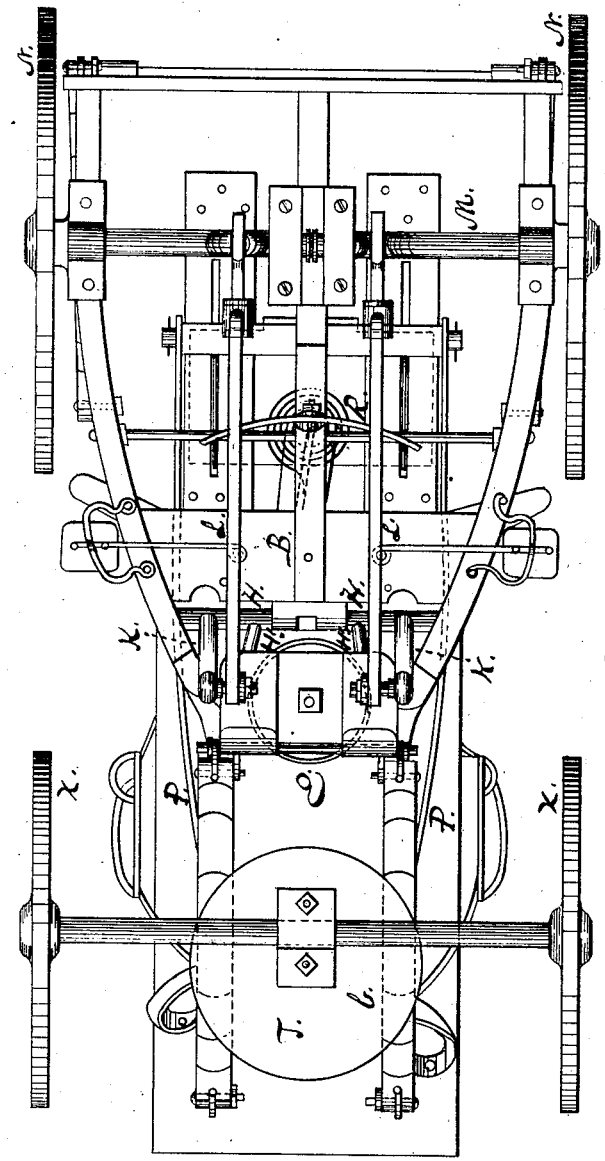

Figure 1 is a side elevation with the wheels on the near side removed to disclose the works. Fig. 2 is an inverted plan, which better shows the relation of much of the works. Fig. 3 is a view of the gearing used in the steering apparatus.

In a description of this mechanism it will be seen that A is a lever for the hands of the operator, pivoted to a standard, A'. The lower end of this lever passes down loose into a horizontal slide-bar, B, which has a branching end, B', on the left, and, rising up, is secured, one branch to each end of an adjustable cross-bar, C, which is pivoted in the center to an upright shaft, D, which starts from a loose socket, D', above, and runs down, solid, through a ball, E. This ball acts as a balance-wheel, and the shaft passing through it as a pitman unites below the ball, loose, with an arm or crank, $f$, on the side of an upright cylinder, $g$. This cylinder has a slot, $g'$, cut through its rim at an oblique angle. H H are two horizontal shafts, to each of which is attached a solid arm, H' H', which, at their connection with the cylinder on either side, have a pin, $i$, working in the slot. The shaft or spindle of the cylinder turns in a long box, $j$, below the cylinder, and is held in place by a nut on its lower end. Also, to the shafts H H, respectively, are attached solid arms K K, passing below and connecting each with a horizontal pitman, L L, which extends back to a separate crank for each in the axle M of the wheels N.

I will now describe the order of operation.

One or more persons sitting in the seat and working the lever A will cause the swing-ball to perform a rotary motion. That motion, by the shaft D and crank $f$, is communicated to the cylinder. The motion of the cylinder causes the arms H' H' to rise and fall as the respective pins come in contact with the different angles of the slot, and this rising and falling of the arms H' carries with them the arms K K and the pitman to which each is attached, which in turn acts upon the crank in the axle with which it is connected, and together they communicate power and motion to the wheels.

To increase the driving-power, I attach one or more levers, O, in front, to bars P, which pass back and connect with the slide-bar B at the rear end and move the swing-ball the same as the lever A. Either or both of the front levers may be dispensed with, or the carriage may be operated by these levers without the lever A.

To impede the motion, or entirely suspend it, I hold the levers firm in the hands; but I have added another brake—the adjustable bar R—with an end resting upon each of the pitmen L, and a rod, S, passes up from each end of this bar through the floor of the carriage, and the foot pressing upon the top of it, S', presses the bar down upon the pitman, and immediately stops the motion.

The steering apparatus consists in a geared fifth-wheel, T, connected with the center of the axle of the front wheels $x$. The rod $a$ has fast on its lower end, between the plates $b\ b'$, the small gear $d$, (see Fig. 3.) Below this gear the rod passes through and turns in the front axle, a nut holding it in position. The plate $b$, which is secured to the axle, has inside of its outer edge the section of a gear, $e$. The upper plate $b'$ has one side of the center a small gear, $h$, which, when the two plates are together, comes between the gears $d$ and $e$. The turning of the rod above gives motion to the front wheels in the opposite direction to the turning of the rod.

Other devices for steering accomplishing substantially the same result may be used.

By these simple devices I put into the hands of one or more persons a means of independent travel with pleasant exercise and diversion.

In the construction of a mechanical carriage, I claim—

1. The swing-ball E as a momentum-balance, in combination with the lever A and shaft D, substantially as set forth.

2. The cylinder $g$, with its slot and crank, in combination with the shaft D and arms H' H', substantially as and for the purposes set forth.

3. The separate pitmen L L, to act upon the cranks of the axle M, and actuated by the cylinder, all combined substantially as described.

4. The extra brake R, in combination with the rods S and pitmen L, substantially as described.

5. The steering apparatus, consisting of the rod $a$, gears $d$, $e$, and $h$, in combination with the front axle and wheels T, substantially as specified.

HENRY THIESSEN.

Witnesses:
HORACE HARRIS,
JOHN C. TUNBRIDGE.